United States Patent
Miller

(10) Patent No.: US 9,221,351 B2
(45) Date of Patent: Dec. 29, 2015

(54) REGULATION CONTROL AND ENERGY MANAGEMENT SCHEME FOR WIRELESS POWER TRANSFER

(75) Inventor: John M. Miller, Oak Ridge, TN (US)

(73) Assignee: UT-BATTELLE, LLC, Oak Ridge, TN (US)

(*) Notice: Subject to any disclaimer, the term of this patent is extended or adjusted under 35 U.S.C. 154(b) by 858 days.

(21) Appl. No.: 13/484,404

(22) Filed: May 31, 2012

(65) Prior Publication Data

US 2013/0020862 A1    Jan. 24, 2013

Related U.S. Application Data

(60) Provisional application No. 61/510,210, filed on Jul. 21, 2011.

(51) Int. Cl.
*H01F 27/42* (2006.01)
*B60L 11/18* (2006.01)
(Continued)

(52) U.S. Cl.
CPC ........... *B60L 11/182* (2013.01); *B60L 11/1838* (2013.01); *B60L 11/1861* (2013.01); *H02J 5/005* (2013.01); *H02J 7/025* (2013.01); *B60L 2240/545* (2013.01); *Y02T 10/7005* (2013.01); *Y02T 10/705* (2013.01); *Y02T 10/7044* (2013.01); *Y02T 90/121* (2013.01);
(Continued)

(58) Field of Classification Search
CPC ........ H02J 5/005; H02J 7/025; Y02T 90/122; Y02T 10/7044; B60L 11/182; B60L 2240/545
USPC .......................................................... 307/104
See application file for complete search history.

(56) References Cited

U.S. PATENT DOCUMENTS

| 5,654,621 | A | 8/1997 | Seelig |
| 6,225,788 | B1* | 5/2001 | Kouzu et al. .................. 320/150 |
| 6,548,985 | B1 | 4/2003 | Hayes et al. |

(Continued)

FOREIGN PATENT DOCUMENTS

| FR | 2 698 324 A1 | 5/1994 |
| GB | 2 347 801 A1 | 9/2000 |

OTHER PUBLICATIONS

International Search Report dated Aug. 30, 2012, issued in International Application No. PCT/US2012/040086.

(Continued)

*Primary Examiner* — Jared Fureman
*Assistant Examiner* — Duc M Pham
(74) *Attorney, Agent, or Firm* — Scully, Scott, Murphy & Presser, P.C.

(57) ABSTRACT

Power transfer rate at a charging facility can be maximized by employing a feedback scheme. The state of charge (SOC) and temperature of the regenerative energy storage system (RESS) pack of a vehicle is monitored to determine the load due to the RESS pack. An optimal frequency that cancels the imaginary component of the input impedance for the output signal from a grid converter is calculated from the load of the RESS pack, and a frequency offset f* is made to the nominal frequency $f_o$ of the grid converter output based on the resonance frequency of a magnetically coupled circuit. The optimal frequency can maximize the efficiency of the power transfer. Further, an optimal grid converter duty ratio d* can be derived from the charge rate of the RESS pack. The grid converter duty ratio d* regulates wireless power transfer (WPT) power level.

31 Claims, 16 Drawing Sheets

(51) Int. Cl.
*H02J 5/00* (2006.01)
*H02J 7/02* (2006.01)

(52) U.S. Cl.
CPC ............. *Y02T 90/122* (2013.01); *Y02T 90/128* (2013.01); *Y02T 90/14* (2013.01); *Y02T 90/163* (2013.01)

(56) References Cited

U.S. PATENT DOCUMENTS

| | | |
|---|---|---|
| 7,250,741 B2 | 7/2007 | Koo et al. |
| 8,796,990 B2 * | 8/2014 | Paparo et al. .................. 320/108 |
| 2011/0231029 A1 * | 9/2011 | Ichikawa et al. ............... 700/298 |
| 2012/0161696 A1 * | 6/2012 | Cook et al. .................... 320/108 |

OTHER PUBLICATIONS

Extended Supplementary European Search Report dated Sep. 24, 2015, issued in International Application No. PCT/US2012/040086.

* cited by examiner

REGULATION CONTROL AND ENERGY MANAGEMENT SCHEME FOR WIRELESS POWER TRANSFER

CROSS-REFERENCE TO RELATED APPLICATIONS

This application claims the benefit of priority from U.S. provisional application No. 61/510,210, filed on Jul. 21, 2011, the entire content of which is included here by reference.

STATEMENT REGARDING FEDERALLY SPONSORED RESEARCH OR DEVELOPMENT

This invention was made with United States government support under Prime Contract No. DE-AC05-00OR22725 awarded by the U.S. Department of Energy. The United States government has certain rights in this invention.

FIELD OF THE INVENTION

The present invention relates to the field of wireless power transfer for stationary charging and dynamic on-road charging of vehicles.

BACKGROUND OF THE INVENTION

Stationary charging refers to charging of a vehicle while the vehicle is stationary. Stationary charging can be performed, for example, at residential garages and public parking garage and ramps. Dynamic on-road charging refers to charging of a vehicle while the vehicle is on the road. The most pressing issues facing wireless power transfer (WPT) charging of plug-in electric vehicles (PEV's) include interoperability, safety and emissions, and bidirectional communications.

SUMMARY OF THE INVENTION

Power transfer rate at a charging facility can be maximized by employing a feedback scheme. The state of charge (SOC) and temperature of the regenerative energy storage system (RESS) pack of a vehicle is monitored to determine the load due to the RESS pack. An optimal frequency that cancels the imaginary component of the input impedance for the output signal from a grid converter is calculated from the load of the RESS pack, and a frequency offset f* is made to the nominal frequency $f_0$ of the grid converter output based on the resonance frequency of a magnetically coupled circuit. The optimal frequency can maximize the efficiency of the power transfer. Further, an optimal grid converter duty ratio d* can be derived from the charge rate of the RESS pack. The grid converter duty ratio d* regulates wireless power transfer (WPT) power level by adjusting the fundamental component of the primary voltage applied to the series resonant primary of the coupling coil assembly, thereby optimizing the power transfer rate to preserve the integrity of the RESS pack and/or to provide economical charging of the RESS pack.

According to an aspect of the present disclosure, a system for wireless power transmission is provided. The system includes a primary circuit including a grid converter and a primary coil located in a primary pad. The system further includes a secondary circuit located in a vehicle and including a secondary coil, a current rectification circuit connected to the secondary coil, and a battery connected to the current rectification circuit. In addition, the system includes a battery management system configured to measure at least one parameter of the battery, and a vehicle-side communication means configured to transmit information on the at least one parameter of the battery. The at least one parameter is a measure of an effective resistance of the battery as seen by the primary circuit. In addition, the system includes an output voltage controller configured to control an alternating current (AC) output voltage of the grid converter based on information derived from the at least one parameter of the battery.

According to another aspect of the present disclosure, a method of wirelessly transmitting power is provided. A primary circuit including a grid converter and a primary coil located in a primary pad is provided. A vehicle is provided, which includes a secondary circuit that includes a secondary coil, a current rectification circuit connected to the secondary coil, a battery connected to the current rectification circuit, a battery management system configured to measure at least one parameter of the battery, a vehicle-side communication means configured to transmit information on the at least one parameter of the battery. The at least one parameter is a measure of an effective resistance of the battery as seen by the primary circuit. An alternating current (AC) output voltage of the grid converter is modified based on information derived from the at least one parameter of the battery.

DETAILED DESCRIPTION OF THE INVENTION

As stated above, the present invention relates to wireless power transfer for stationary charging and dynamic on-road charging of vehicles, which is now described in detail with accompanying figures. A vehicle may be an automobile, a shuttle, a trolley, a golf-type cart, a forklift, or any other type of electrified vehicle. The drawings are not drawn to scale.

As used herein, a "grid converter" herein refers to a device that takes alternating current (AC) supply voltage having a frequency less than 1 kHz and generated alternating current (AC) supply voltage having a frequency greater than 1 kHz.

To address the requirement of interoperability for wireless power transfer (WPT), global standardization of WPT operating frequency, coupling coil dimensions and locations on both parking space and vehicle, and the treatment of misalignment between the vehicle mounted receiver coil and the floor mounted (on or embedded in) transmit coil can be employed. For example, SAE J2954 Wireless Charging Task Force has the charter to develop such standards, safety and emissions, and bidirectional communications.

The requirement of safety is inherently satisfied in WPT because the magnetic transfer eliminates the need for vehicle leakage current detection and minimization to prevent shock hazard. This minimizes the need for galvanic isolation of the WPT charging system components so that the power delivered may be taken directly to the vehicle battery pack. However, safety also involves magnetic and electric field emissions and these are already covered by international standards such as ICNIRP and ARPANSA.

Figure 1A:
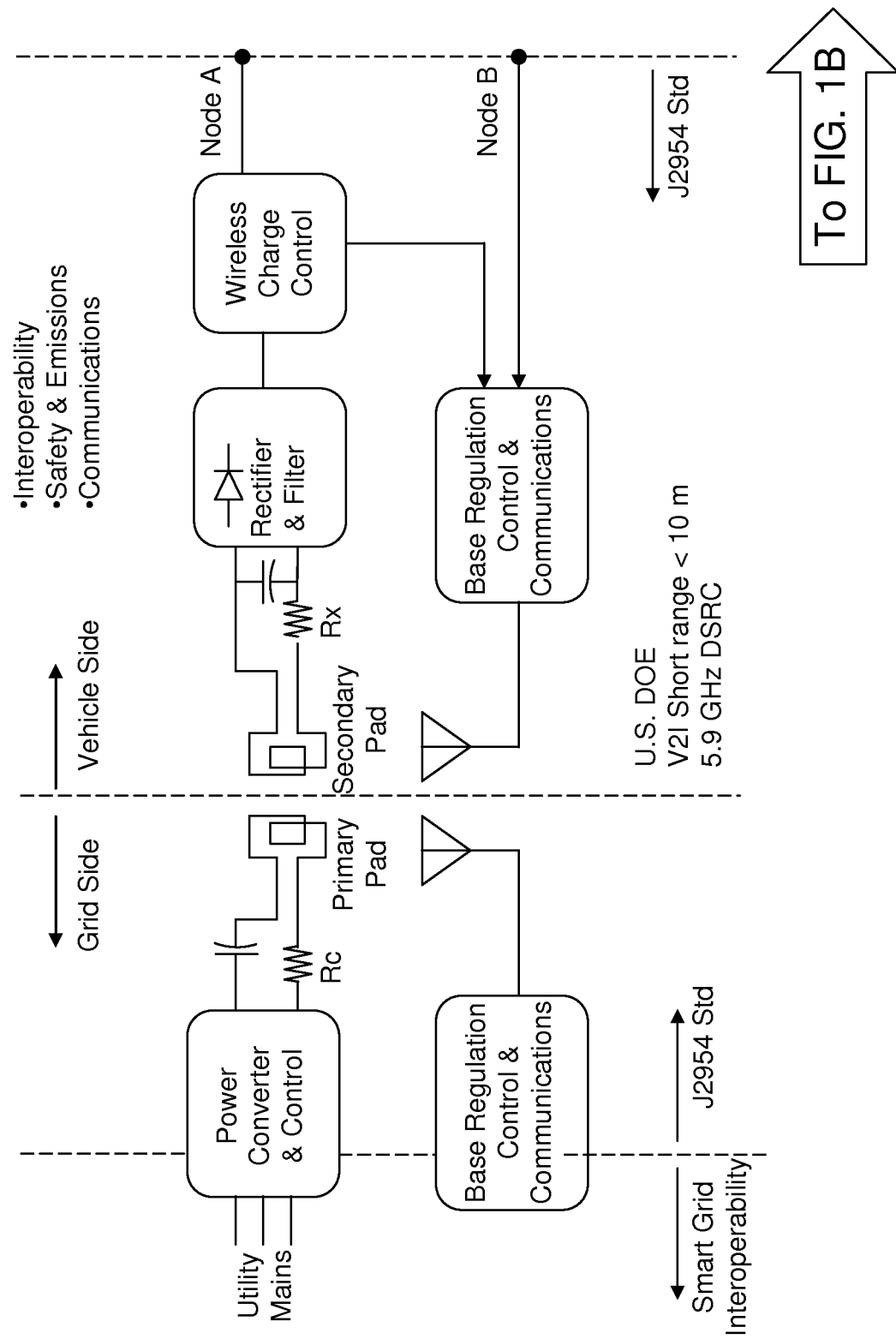
FIGS. 1A and 1B show a functional diagram of an exemplary wireless power transfer system according to an embodiment of the present disclosure.
Figure 1B:
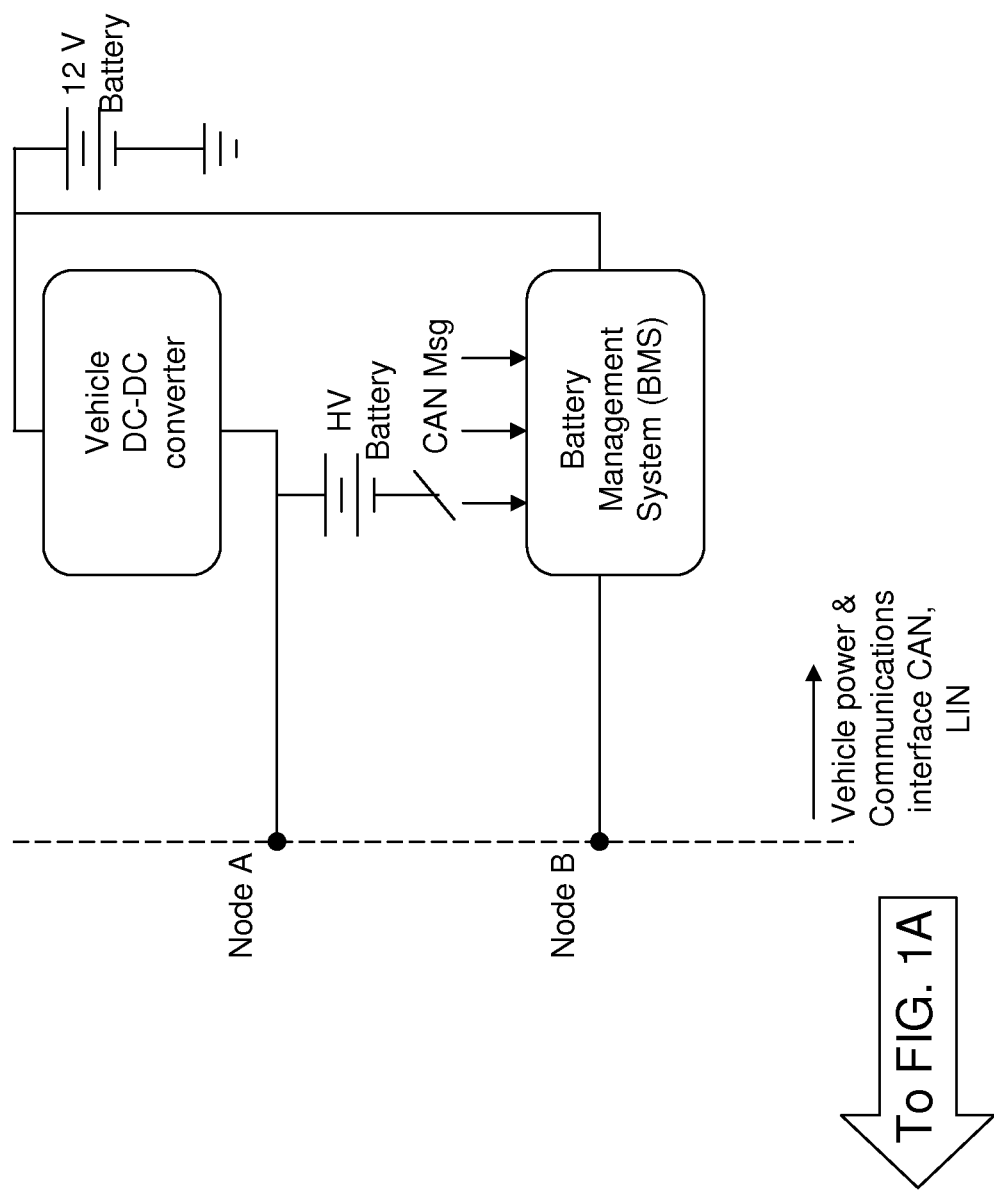

The requirement of bidirectional communications can be satisfied employing vehicle to infrastructure (V2I) communications for the purpose of communicating vehicle location relative to the charging pad, activation signals and regenerative energy storage system (RESS) state-of-charge (SOC), state-of-health (SOH) if needed, charge rate, temperatures, voltage, etc. to the grid connected power inverter. The grid converter on the other hand may initiate power transfer by communicating with the vehicle to insure proper location relative to the transmit pad, all clear signals that no obstacles or biologics are present in the active zone and utility rate and time of use (TOU) data for most economic charging. Coil to coil location, all clear signal, activate signal, power level and inhibit signals can be employed to provide proper energy management between the WPT charger and the vehicle RESS. The functional diagram in FIGS. 1A and 1B illustrates the overall scheme for energy management and RESS pack regulation needed in WPT.

In the functional diagram of FIG. 1, the grid connected power converter is connected to an appropriate utility service such as a 240 $V_{ac}$, single phase line for level 2 power feed at 3 kW to 7 kW. As used herein, $V_{ac}$ refers to an alternating current voltage, and $V_{dc}$ refers to a direct current voltage. For higher power levels such as direct current (DC) fast charge level 2 (40 kW to 70 kW) or DC fast charge level 3 (>70 kW and up to 250 kW or higher), a 480 $V_{ac}$ and 3-phase connection, or a higher voltage such as direct connection to medium voltage distribution line (2.4 kV to 11 kV) can be employed. Once such a power supply is provided, it is feasible to use such high power WPT for commercial applications such as shuttles, trolleys, and transit bus wireless charging. Rectified mains voltage, $U_d$, is processed by a power converter and control module to a controlled duty ratio quasi-square wave at the specified operating frequency as the means to regulate the power delivery.

Resonant magnetic coupling provides a coupling between a primary circuit located on the grid side, i.e., on a charging facility, and a secondary circuit located on a vehicle side, i.e., within a vehicle. Specifically, resonant magnetic coupling provides the non-contacting power transfer medium from a primary coil of the primary circuit located in a primary pad to a vehicle mounted receiver coil, i.e., a secondary coil of the secondary circuit located in a secondary pad that is mounted to the vehicle.

A rectifier and filter module converts the alternating current induced in the secondary coil into a direct current voltage, which applied to a high voltage (HV) battery through a wireless charge control module. A battery management system (BMS) monitors the state of the HV battery, and provides information to a component, within the vehicle, of a base regulation control and communications module. The HV battery can be configured to provide a DC voltage, for example, in a range from 100 V to 1 kV. A vehicle DC-DC converter can be employed to charge a 12 V battery within the vehicle to supply ancillary loads.

Figure 2:
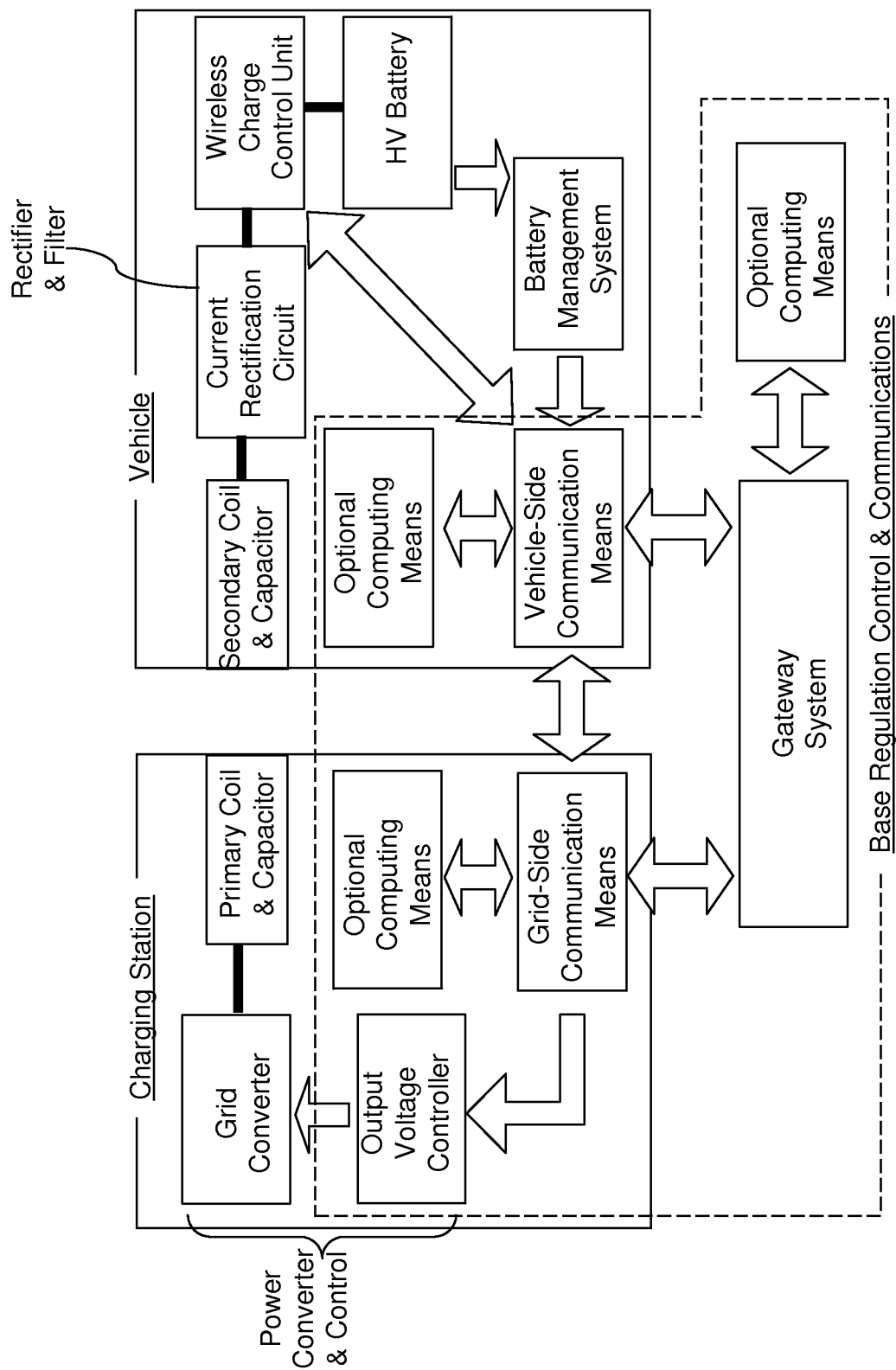
FIG. 2 shows a schematic of a portion of the exemplary wireless power transfer system of FIGS. 1A and 1B according to an embodiment of the present disclosure.

Referring to FIG. 2, a portion of the exemplary wireless power transfer system of FIGS. 1A and 1B is schematically illustrated. The system includes a charging station, a vehicle, and an optional gateway system, and an optional computing means in communication with the gateway system. The charging station includes the primary circuit, which includes the grid converter and the primary coil. The vehicle includes the secondary circuit, which includes the secondary coil, the current rectification circuit, a wireless charge control unit, and a high voltage (HV) battery. The total impedance of the current rectification circuit, the wireless charge control unit, and the HV battery as seen by the combination of the secondary coil and a parallel tuning capacitor of the secondary circuit is herein referred to as the load of the secondary circuit.

The primary circuit includes a grid converter and a primary coil located in a primary pad. The secondary circuit is located in the vehicle and includes a secondary coil, a parallel tuning capacitor, a current rectification circuit connected to the secondary coil, and a battery connected to the current rectification circuit. The vehicle further includes a battery management system configured to measure at least one parameter of the battery, and a vehicle-side communication means configured to transmit information on the at least one parameter of the battery. The at least one parameter is a measure of an effective resistance of the battery as seen by the primary circuit. The charging station can further include an output voltage controller configured to control an alternating current (AC) output voltage of the grid converter based on information derived from the at least one parameter of the battery.

In one embodiment, the AC output voltage can be a quasi-square wave or a square wave, and has a duty ratio in a range from, and including, 0 to, and including, 1. The output voltage controller can be configured to control at least one of a duty cycle of the AC output voltage, a frequency of the AC output voltage, and a magnitude of the AC output voltage. Additionally or alternately, the output voltage controller can be configured to control a duty cycle of the AC output voltage, a frequency of the AC output voltage, and a magnitude of the AC output voltage.

In one embodiment, the at least one parameter of the battery measured by the battery management system can include at least one of temperature of the battery, a voltage level of the battery, and state of charge of the battery. In one embodiment, the at least one parameter of the battery measured by the battery management system can include the temperature of the battery, voltage level of the battery, and state of charge of the battery. Additionally or alternately, the at least one parameter of the battery measured by the battery management system can include the charge rate of the HV battery.

In one embodiment, the at least one parameter of the battery measured by the battery management system can include a parameter that is identical to, or is linearly proportional to, the effective resistance of the battery as seen by the primary circuit.

Optionally, a gateway system can be provided. The gateway system can be configured to receive information on the at least one parameter of the battery as transmitted by the vehicle-side communication means, and can be configured to transmit the information derived from the at least one parameter, directly or indirectly, to the output voltage controller. In one embodiment, the gateway system can employ internet.

In one embodiment, a grid-side communication means can be provided. The grid-side communication means can be configured to receive the information derived from the at least one parameter, and can be configured to relay the information derived from the at least one parameter to the output voltage controller.

In one embodiment, the information derived from the at least one parameter of the battery includes a target value for each of one or more waveform parameters of the AC output voltage of the grid converter. In one embodiment, a computation means configured to generate the one or more target values from the at least one parameter of the battery can be provided within the vehicle, within the charging station, or outside the vehicle and outside the charging station as an independent unit. The computing means is in communication with at least one of a vehicle-side communication means provided within the vehicle, a grid-side communication means provided within the charging station, or with the gateway system. The vehicle-side communication means, the grid-side communication means, the computing means, the output voltage controller for the grid converter, and the optional gateway system collectively constitute a base regulation control and communications system.

In one embodiment, the gateway system can be configured to receive information on the at least one parameter of the battery as transmitted by the vehicle-side communication means, and can be configured to transmit the one or more target values for each of one or more waveform parameters of the AC output voltage of the grid converter, directly or indirectly, to the output voltage controller. The computation means can be in communication with the gateway system.

In one embodiment, the computation means can be located within the vehicle and can be in communication with the battery management system and the vehicle-side communication means. The information on the at least one parameter of the battery as transmitted by the vehicle-side communication means can include the one or more target values for each of one or more waveform parameters of the AC output voltage of the grid converter.

In one embodiment, the computation means can be located within a facility that houses the grid converter, i.e., within the charging station. The computation means can be in communication with the vehicle-side communication means directly or indirectly, and the one or more target values for each of one or more waveform parameters of the AC output voltage of the grid converter can be provided to the grid converter.

In one embodiment, the one or more target values for each of one or more waveform parameters of the AC output voltage of the grid converter can include a target frequency for the AC output voltage. Additionally or alternately, the one or more target values for each of one or more waveform parameters of the AC output voltage of the grid converter can include a target magnitude for the AC output voltage. Additionally or alternately, the one or more target values for each of one or more waveform parameters of the AC output voltage of the grid converter can include a target value for a parameter that controls a magnitude of a fundamental component of the AC output voltage.

In one embodiment, the at least one parameter of the battery that the battery management system measures can include the temperature of the battery and the state of charge (SOC) of the HV battery. As used herein, the state of charge of the battery refers to the ratio of the energy stored in a battery ($Wh_x$) to the total (100% SOC) energy storage capacity of the battery ($Wh_{100}$). The computation means can be configured to determine a charge rate of the battery from the temperature of the battery and the SOC of the battery.

In one embodiment, the at least one parameter of the battery that the battery management system measures can further include a voltage level of the battery. The computation means can be configured to determine the effective resistance of the battery as seen by the primary circuit. Further, the computation means can be configured to determine an input impedance of the secondary circuit as seen by the primary circuit. In addition, the computation means can be configured to determine a frequency at which an imaginary component of input impedance of a circuit including the primary circuit and incorporating the input impedance of the secondary circuit becomes zero.

The primary pad housing the primary coil can be located in any place that a vehicle can be placed proximately to. In one embodiment, the primary coil can be located within a facility configured to park or store vehicles. In another embodiment, the primary coil can be located underneath, or over, a road configured to allow vehicles to pass through. In yet another embodiment, the primary coil can be located within a structure located on a side of a road configured to allow vehicles to pass through.

In a non-limiting exemplary embodiment, the output voltage controller and the grid-side communications means can be embodied in a grid converter V2I communications and regulation control unit. The grid converter V2I communications and regulation control unit can receive, directly or indirectly from the vehicle, dedicated short range communications (DSRC) message for charge level and frequency offset needed for energy management of the regenerative energy storage system (RESS) pack.

The base regulation control and communications function interprets the DSRC message as a command for grid converter duty ration d* and frequency offset f*. The grid converter duty ratio d* provided to the grid converter regulates WPT power level by adjusting the fundamental component, $U_1(t)$, applied to the series resonant primary of the coupling coil assembly. In this expression $T_1=1/f$, and f represents the operating frequency of WPT (when standardized: 10 kHz<f<140 kHz), and pulse time τ is given by $d*T_1/2$.

The fundamental component of a quasi-square wave voltage $U_1(t)$ can be given as Eq. (1) and can be controlled between zero and 100% duty (i.e., 0<d*<1). The limiting case of Eq. (1) where d* becomes 1 is a square wave, for which $U_1(t)$ is given by Eq. (2).

$$U_1(t) = \frac{4\tau U_d}{T_1}\left[\frac{\sin(\pi^\tau/T_1)}{\pi^\tau/T_1}\right]\cos(\omega_1 t)\bigg|_{\tau=d\frac{T_1}{2}} = \frac{4U_d}{\pi}\sin\left(d\frac{\pi}{2}\right)\cos(\omega_1 t) \quad (1)$$

$$U_1(t) = \frac{4U_d}{\pi}\cos(\omega_1 t) \quad (2)$$

$$U_d = \frac{2\sqrt{2}}{\pi}U_{rms} = 0.9(240) = 216 \quad (3)$$

For example, a WPT base power inverter connected to a residential 240 $V_{ac}$ single phase supply will have a nominal $U_d$=216 $V_{dc}$ by application of (3). If the converter duty is 0.4, i.e., d*=0.4, then the rectified dc link voltage from Eq. (3) is converted to a high frequency WPT excitation voltage $U_1$ that is given by:

$$U_1(d^* = 0.4) = \frac{4(216)}{\pi}\sin\left(0.4\frac{\pi}{2}\right)\cos\omega_1 t = 162 \text{ V}_{rms} \quad (4)$$

Figure 3A:
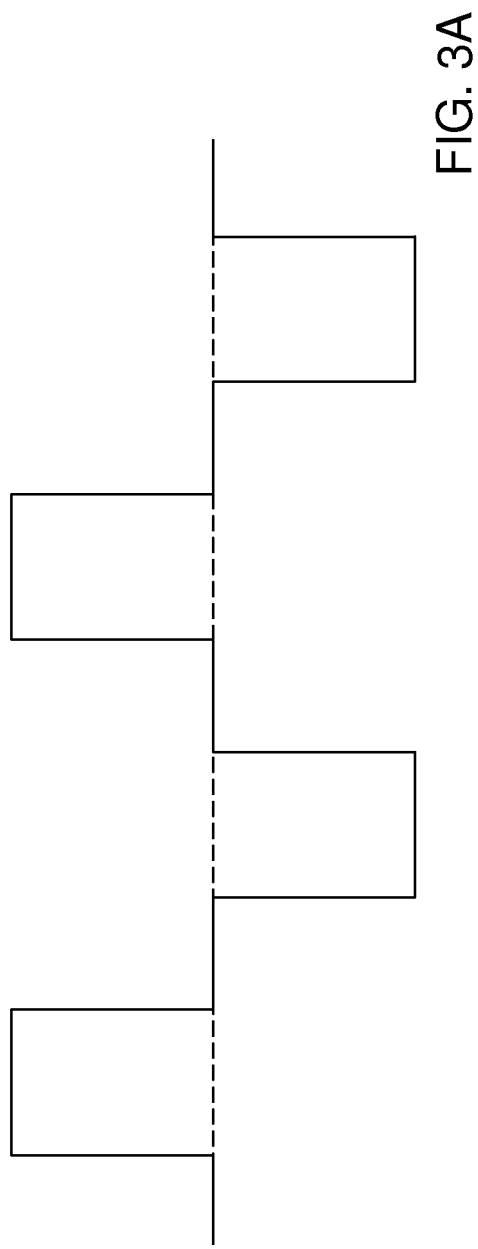
FIG. 3A is a schematic waveform of an alternating current (AC) output voltage of a grid converter according to an embodiment of the present disclosure.
Figure 3B:
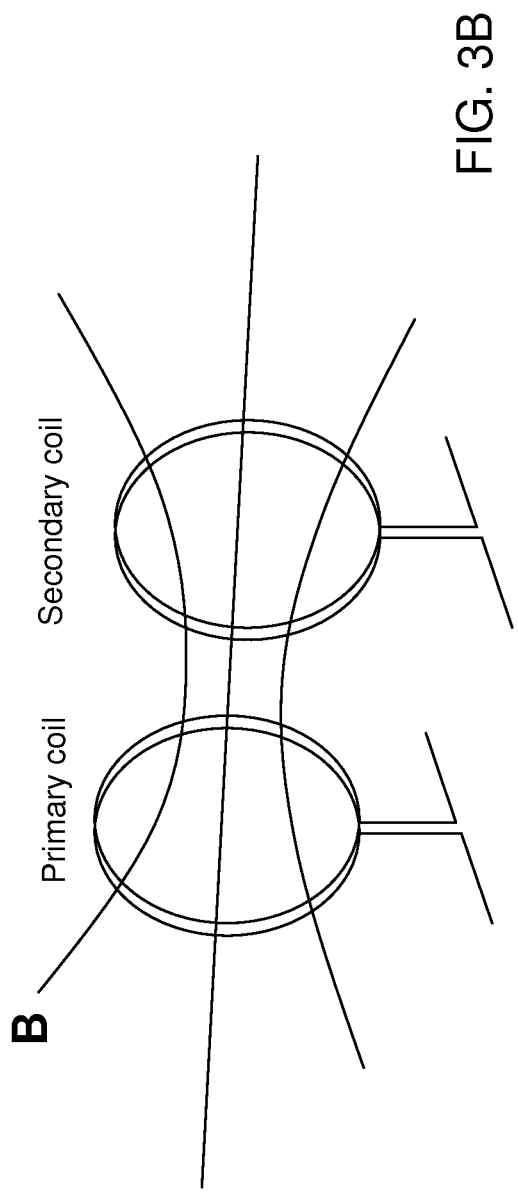
FIG. 3B is a schematic diagram illustrating coupling of a magnetic field between a primary coil and a secondary coil according to an embodiment of the present disclosure.
Figure 3C:
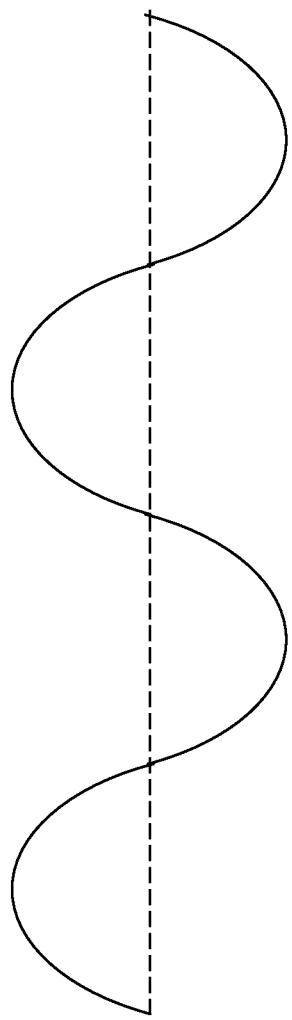
FIG. 3C is a schematic waveform of a secondary current through the secondary coil according to an embodiment of the present disclosure.
Figure 3D:
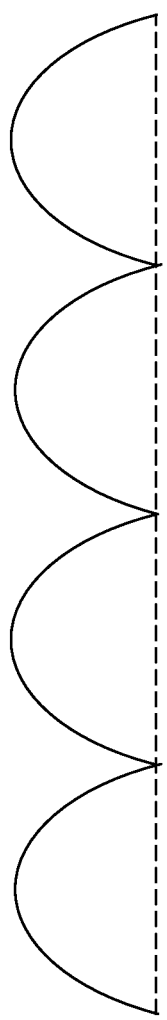
FIG. 3D is a schematic waveform of a rectified current according to an embodiment of the present disclosure.
Figure 3E:
FIG. 3E is a schematic waveform of an ideal direct current (DC) voltage applied across a battery to be charged according to an embodiment of the present disclosure.

Wireless charge coupling coil transmission of the power generated by the grid converter as quasi-square wave voltage to a rectified direct current voltage is illustrated in FIGS. 3A-3E. The quasi-square wave voltage generated by the grid converter can have the waveform illustrated in FIG. 3A. The magnetic coupling between the primary coil and the secondary coil of the magnetic field B as illustrated in FIG. 3B induces a nearly sinusoidal secondary current through the secondary coil of the secondary circuit as illustrated in FIG. 3C. The nearly sinusoidal current is rectified to provide an input voltage as illustrated in FIG. 3D. The receiver WPT coil output, after rectification, is applied to a filter to smooth the high frequency AC ripple prior to injection into the battery pack (assumed to be lithium-ion) of the HV battery. The voltage applied to the HV battery is schematically illustrated in FIG. 3E. The dotted lines in FIGS. 3A, 3C, 3D, and 3E refer to electrical ground, i.e., the voltage of 0 V.

In one embodiment, signals from the battery management system (BMS) and supporting messages from the vehicle CAN network can be routed via the vehicle regulation control and DSRC communications to the grid controller to manage RESS charging. In one embodiment, the EMS signals can include the RESS pack SOC and the temperature, which can be employed to determine the grid converter duty ratio d*. Coupling coil spacing, alignment and RESS charge rate necessitate an additional control signal for frequency offset f*.

Figure 4A:
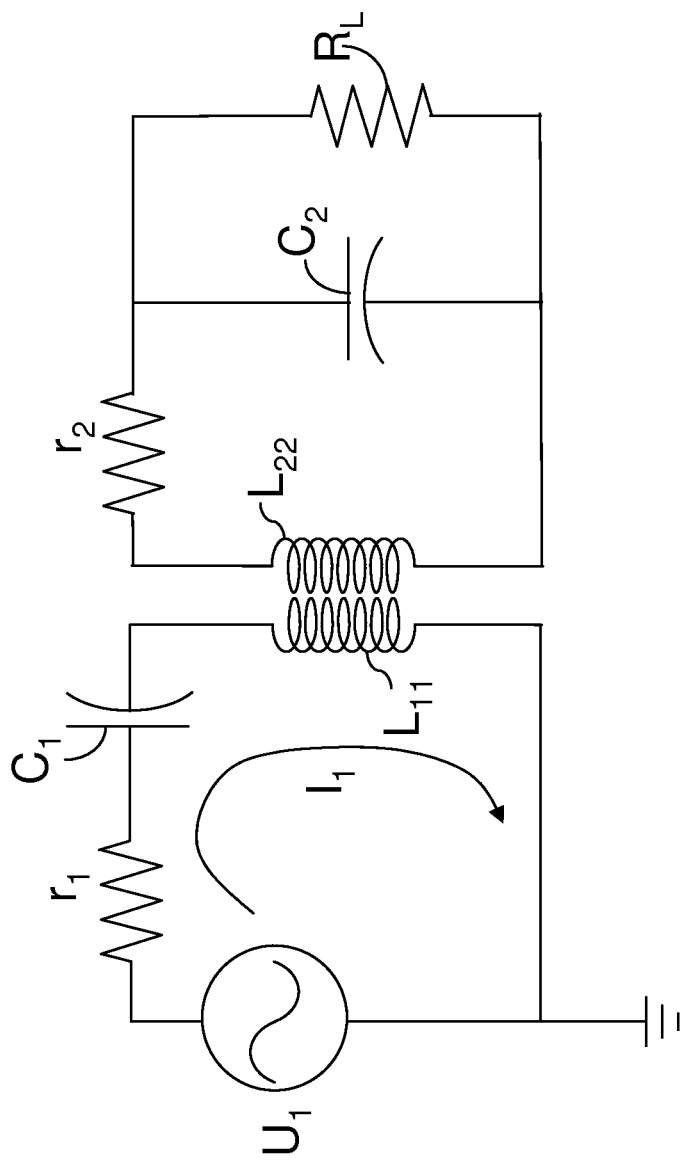
FIG. 4A is a schematic of a series-parallel tuned coupling circuit according to an embodiment of the present disclosure.

The actual control of WPT power transfer can be obtained from analysis of loosely coupled magnetic resonance. FIG. 4A illustrates the fundamental case that contains all the essentials of a fully operational WPT system. In this figure the primary coil is compensated using a series capacitor to form a series resonant L-C-R circuit. The primary coil is magnetically coupled to a receiver coil when the two are in proximity and communicating via the mutual field. This secondary coil is tuned using a parallel connected capacitance and under loaded conditions the RESS load is present across this tuning capacitor and represented using the load resistance, $R_L$. The source resistance and the primary coil resistance are collectively represented as first resistance $r_1$, and the secondary coil resistance is represented as a second resistance $r_2$. For analysis, coupled mode theory is applied to the WPT schematic of FIG. 4A in order to reflect the complete vehicle mounted secondary circuit into the primary circuit including the grid side converter. Doing so greatly simplifies analysis and understanding of its operation.

Figure 4B:
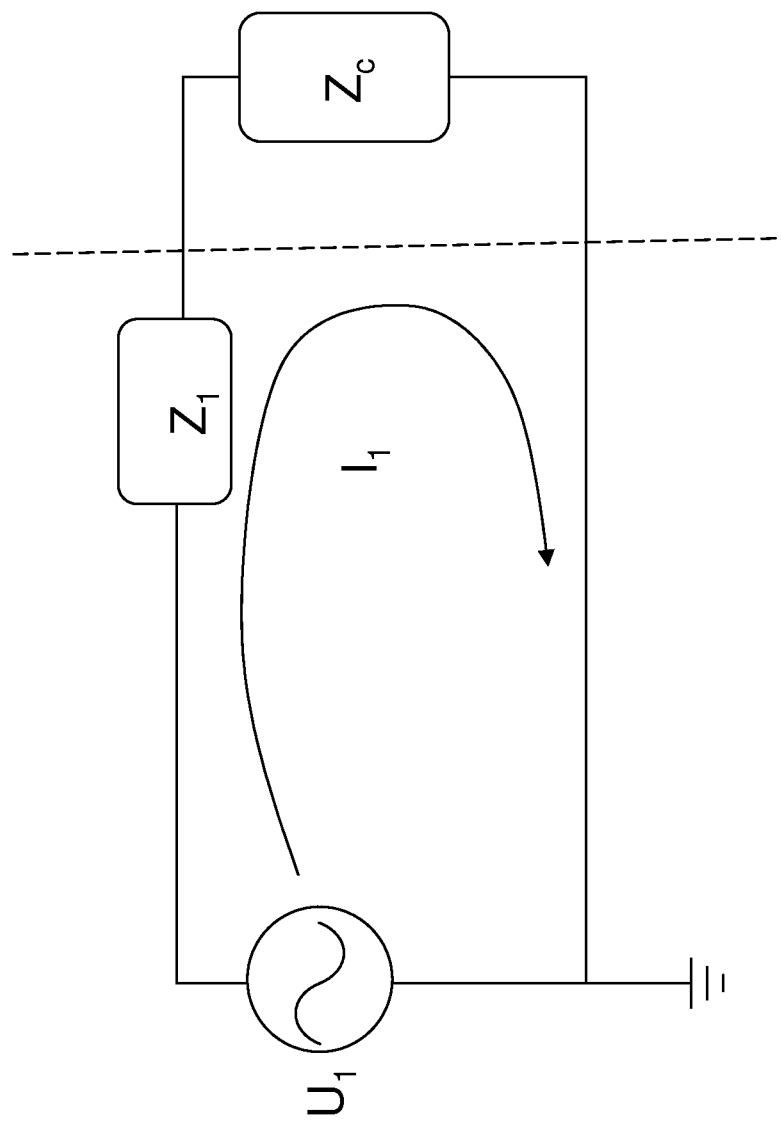
FIG. 4B is a schematic of an equivalent circuit representing the combination of the primary circuit and the secondary circuit derived by incorporating into the primary circuit the input impedance of the secondary circuit as seen by the primary circuit according to an embodiment of the present disclosure.

For the circuit shown in FIG. 4A, the primary impedance, $Z_1$ is defined in Eq. (5). The secondary side, which corresponds to a combination of a vehicle mounted receiver coil, the tuning capacitor, and RESS equivalent loading, is defined as secondary impedance $Z_2$ in Eq. (6). In complex analysis, j=sqrt{−1}. In the derivation of Eq. (6), the equivalent loading is shown coupled with the secondary tuning element. FIG. 4B shows an equivalent circuit of the series-parallel tuned coupling circuit of FIG. 4A in a coupled mode.

$$Z_1 = r_1 + j\left(\omega L_{11} - \frac{1}{\omega C_1}\right) = r_1 + jX_1 \quad (5)$$

$$Z_2 = \left(r_2 + \frac{R_L}{1+\omega^2 C_2^2 R_L^2}\right) + j\left(\omega L_{22} - \frac{\omega C_2 R_L^2}{1+\omega^2 C_2^2 R_L^2}\right) = R_{2L} + jX_{2L} \quad (6)$$

$X_1$ refers to the imaginary component of the impedance of the primary circuit, $R_{2L}$ refers to the real component of the impedance of the secondary circuit, and $X_{2L}$ refers to the imaginary component of the impedance of the secondary circuit.

With coupling coil mutual inductance M, the equivalent impedance $Z_c$ of the secondary circuit as seen by the primary circuit, shown in the equivalent circuit of FIG. 4B, can be obtained by combining the mutual inductance and secondary impedance $Z_2$. For example, the coupling coil mutual inductance M can be the turns ratio in a tightly coupled iron cored transformers. The equivalent impedance $Z_c$ of the secondary circuit as seen by the primary circuit is given by:

$$Z_c = \frac{(\omega M)^2 R_{2L}}{R_{2L}^2 + X_{2L}^2} - j\frac{(\omega M)^2 X_{2L}}{R_{2L}^2 + X_{2L}^2}, \quad (7)$$

The input impedance, $Z_{in}$, of the equivalent circuit of FIG. 4B becomes:

$$Z_{in} = \left(r_1 + \frac{(\omega M)^2 R_{2L}}{R_{2L}^2 + X_{2L}^2}\right) + j\left(X_1 - \frac{(\omega M)^2 X_{2L}}{R_{2L}^2 + X_{2L}^2}\right) = R_{in} + jX_{in} \quad (8)$$

Calculation of the source input current now follows directly from Ohm's law and the derivation of grid converter synthesized voltage, $U_1$, as Eq. (9) where it is understood that quantities are complex numbers:

$$i_1 = \frac{U_s}{Z_{in}}; \theta = \tan^{-1}\left(\frac{X_{in}}{R_{in}}\right) \quad (9)$$

Using these results the input power, $P_{in}$, and input volt amperes, $Q_{in}$ and apparent input power, $S_{in}$ and the transferred power, $P_{12}$, can be summarized:

$$P_{in}=U_1 i_1 \cos\theta; PF=\cos\theta \qquad (10)$$

$$Q_{in}=U_1 i_1 \sin\theta \qquad (11)$$

$$S_{in}=\sqrt{P_{in}^2+Q_{in}^2} \qquad (12)$$

$$P_{12}=i_1^2 \mathcal{R}\{Z_c\} \qquad (13)$$

$$Q_{12}=i_1^2 \mathcal{J}\{Z_c\} \qquad (14)$$

where, $\mathcal{R}$ refers to the real part of the specified quantity, and $\mathcal{J}$ refers to the imaginary part of the specified quantity. For low values of $r_2$ relative to $R_L$, the transferred power $P_{12}$ can be used as a surrogate for output power, $P_O$. This over simplification will be used in the following for expediency.

The above calculations can be employed to analyze WPT responses as a function of frequency. How the RESS loading appears as a representative resistance, $R_L$, and how the RESS loading influences the operating frequency are discussed below. Further, the need to add (or subtract) a frequency offset f* from the WPT standardized frequency $f_0$, i.e., the resonance frequency of the coupled coils, in order to optimize the WPT process is also discussed below.

The conjugate matched operating point for a given load resistance (RESS charging burden) can be subsequently defined. In one exemplary experimental set up, the primary resonant frequency $f_{01}$ of the primary circuit was 24.8 kHz, and the secondary resonant frequency $f_{02}$ of the secondary circuit was 25.63 kHz. Referring to the coupled mode theory equivalent circuit of FIG. 4B, the conjugate matching condition applies at the juncture of the primary impedance $Z_1$, and the coupled (e.g., reflected) impedance $Z_c$. This is not a physical point but rather can be considered as existing within the magnetic field and is described by Eq. (15).

$$\mathcal{J}\{Z_1\}=-\mathcal{J}\{Z_c\}; \mathcal{J}\{Z_c\}=-\mathcal{J}\{Z_1\} \qquad (15)$$

The conjugate matching can be performed by changing the primary impedance $Z_1$ within the primary circuit, the coupled impedance $Z_c$, or a combination of the primary impedance $Z_1$ within the primary circuit and the coupled impedance $Z_c$. The primary impedance $Z_1$ can be changed by changing the impedance of components within the primary circuit. The coupled impedance $Z_c$ can be changed by changing the impedance of components within the primary circuit and/or by changing the mutual inductance between the primary coil and the secondary coil, e.g., by changing the spacing between the primary coil and the secondary coil. In one embodiment, the coupled impedance $Z_c$ can be changed by changing the impedance of the secondary circuit, for example by altering a component value or through timing of the rectification stage to effect a phase shift in current. At the conjugate matching condition, the imaginary components of the input impedance $Z_{in}$ cancel out in the circuit of FIG. 4B. Thus, at the conjugate matched condition for maximum power transfer at maximum power factor via WPT, Eq. (16) is satisfied.

$$\frac{(\omega^2 L_{11}C_1-1)}{\omega C_1} = \frac{(\omega M)^2[\omega L_{22}(1+\omega^2 C_2^2 R_L^2)-\omega C_2 R_L^2](1+\omega^2 C_2^2 R_L^2)}{(r_2+(1+\omega^2 C_2^2 R_L^2)+R_L)^2 + (\omega L_{22}(1+\omega^2 C_2^2 R_L^2)+\omega C_2 R_L^2)^2} \qquad (16)$$

For a given value of RESS equivalent load, Eq. (16) determines the angular frequency $\omega$ that needs to be provided for maximum power transfer at maximum power factor via WPT. Once Eq. (16) is solved for $\omega$, the optimal power transfer frequency f is given by $f=2\pi\omega$.

Thus, two control signals are necessary for proper energy management strategy and control, d* and f*, where $f^*=(f-f_0)=\omega/2\pi-f_0$. $\omega$ is obtained by solving Eq. (16), and d* is employed to change the magnitude of the fundamental component of the quasi-square waveform within a time period less than the period of the utility mains (e.g., 60 Hz) applied to the grid converter.

Ultimately, the viability of wireless power transfer, whether at SAE Level 2 (3 to 19 kW), or at high power (100 kW to >250 kW) as would be needed for an electric transit bus, comes down to the efficiency, size and cost of the coupling coils. The energy management strategy for WPT amounts to vehicle on-board monitoring of the RESS using the BMS and having these signals available on vehicle CAN bus. DSRC communications closes the loop on charging by feeding back the control signals to the grid side converter. The impact is fast, accurate and safe charging of the vehicle battery pack. Overall economics are determined by the benefits WPT brings to PEV charging, least of all convenience and in the future on-road dynamic charging.

The example described hinges on the RESS chemistry, but can be condensed to operational relations between SOC and charge rate, $P_{chg}$, which in turn is controlled by the grid converter duty ratio d*. In one embodiment, the EMS strategy can employ the derivation scheme (17), a definition given by Eq. (18) for charge rate $P_{chg}$ in terms of RESS battery potential $U_b$, and the derivation scheme (19):

$$SOC \rightarrow P_{chg} \rightarrow d^* \rightarrow U_1 \qquad (17)$$

$$R_L = \frac{U_b^2}{P_{chg}} \qquad (18)$$

$$P_{chg} \rightarrow R_L \rightarrow f \rightarrow f^* \qquad (19)$$

The function describing the derivation of the charge rate $P_{chg}$ from the state of charge (SOC) and the battery temperature for the first part of the derivation scheme (17) is highly nonlinear and chemistry dependent, but can be visualized as a map between SOC and charge acceptance. For lithium-ion and lithium-polymer chemistry the operating temperatures basically fall into bands as shown in the following table:

TABLE 1

| Environmental bands for lithium-ion chemistries as it pertains to EMS | |
|---|---|
| Band | T (° C.) |
| $T_1$ | −20~0 |
| $T_2$ | 0~20 |
| $T_3$ | 20~35 |
| $T_4$ | 35~60 |

Figure 5:
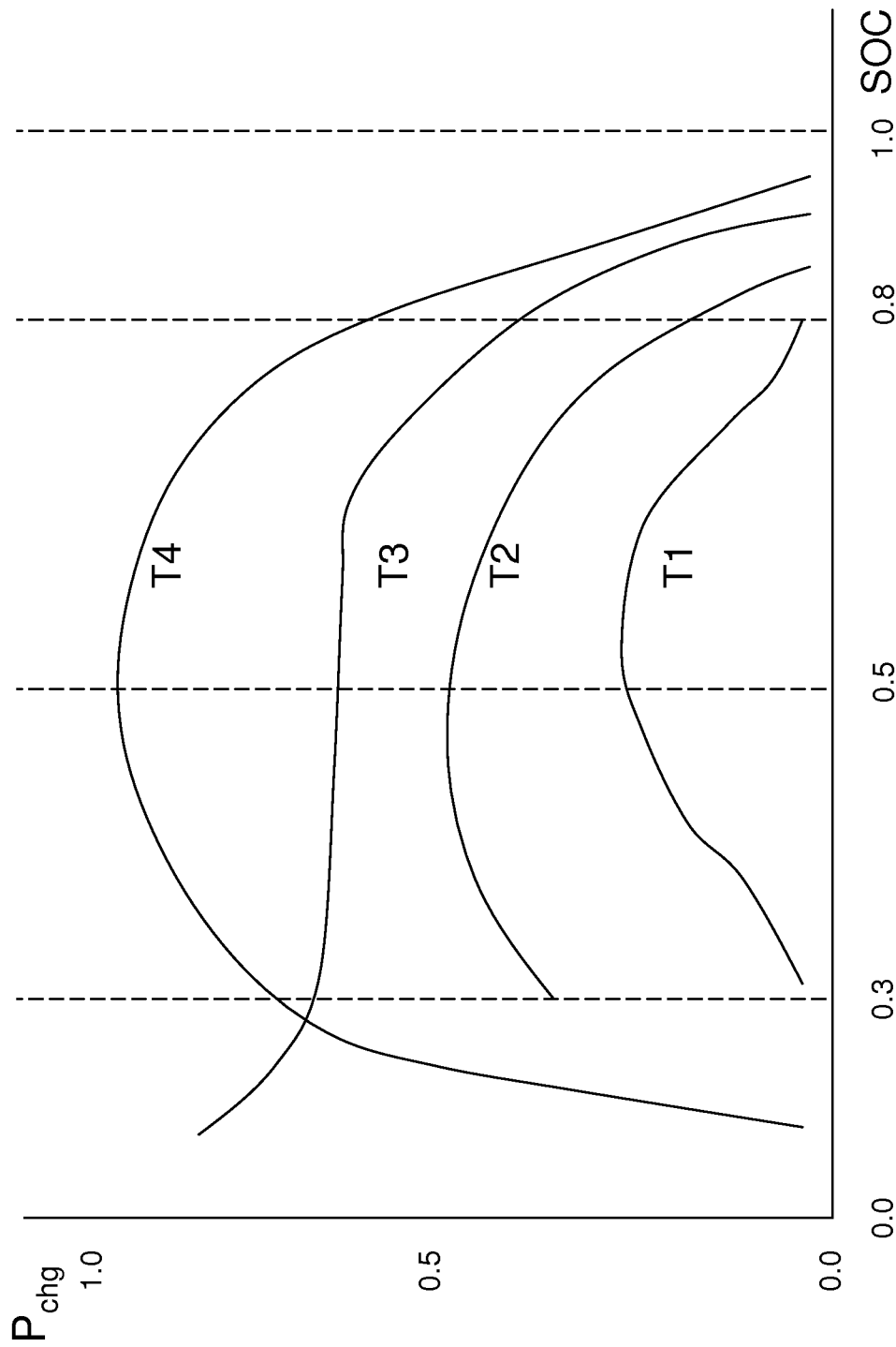
FIG. 5 represent a graph illustrating the dependence of charge rate $P_{chg}$ on the state of charge (SOC) and the operating temperature of a battery according to an embodiment of the present disclosure.

With these band definitions the charge rate can be found on a multivalued function of SOC. This is true because for SOC<30%, the cathode has been seriously depleted and structural changes may have occurred due to exfoliation and also ionic reactions can be occurring between the electrolyte and copper current collector on the anode. The cell resistance as a consequence will increase. At top of charge the rate at which lithium-ions can intercalate back into the cathode must be limited to the rate that cathode lithium-metal-oxide composite can self-assemble. If the charging voltage is too high the electrolyte can start to disassociate as well as having oxygen release from the cathode in the presence of internal heat, a situation to avoid. Therefore, charge rates are dependent on the state of charge (SOC) and the temperature of the battery as shown in FIG. 5.

Once the charge rate $P_{chg}$ is derived from the state of charge (SOC) and the battery temperature, the RESS battery potential $U_b$ across the HV battery can be measured. Eq. (18) can then be employed to determine the resistive load $R_L$ that the HV battery adds to the secondary circuit as indicated in the derivation scheme (19). Once the resistive load $R_L$ that the HV battery is known, Eq. (16) can be solved to determine the optimal ω, the optimal f, and the target frequency offset f*. Further, the derivation scheme (17) can further be employed to determine the optimal magnitude of the fundamental component of the quasi-square wave voltage $U_1(t)$ based on the charge rate $P_{chg}$ so that the HV battery is charged at the optimal charge rate and is protected from chemical conditions that degrade the HV battery. The optimal magnitude of the fundamental component of the quasi-square wave voltage $U_1(t)$ can be adjusted by setting the grid converter duty ratio d*.

Figure 6:
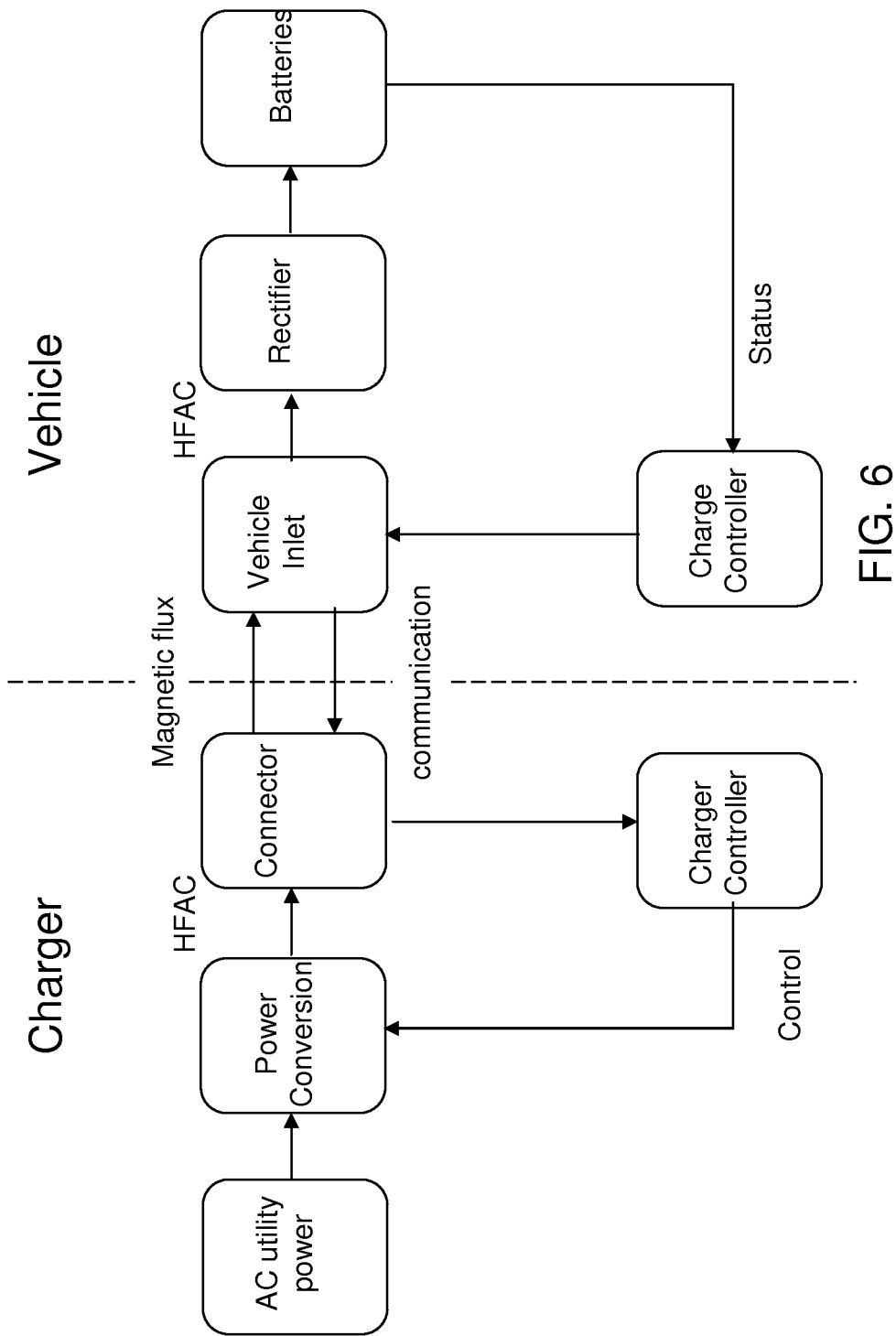
FIG. 6 is a high level functional diagram for the WPT illustrating various modules of an exemplary wireless power transfer system according to an embodiment of the present disclosure.

FIG. 6 is a high level functional diagram for the WPT. The functional diagram of FIG. 6 highlights the major elements of wireless power transmission. The power flow path includes the magnetic flux that passes through the coupling coils, i.e., the primary coil and the secondary coil.

In one embodiment, the communications channel can adhere to U.S. department of transportation (DOT) dedicated short range communications (DSRC), a 5.9 GHz band dedicated to 10 m to 300 m bidirectional, private and secure communications. This channel can be used for all V2I communications. For example, initial hand shaking between the base grid connected power converter and the vehicle can be first performed. The initial hand shaking can take the form of the grid side WPT system assisting in vehicle alignment by interacting through a vehicle parking aid for instance. Subsequently, the system can ensure that no obstacles or biologics are present in the active field zone before enabling the power transfer.

Regarding the power flow regulation, the status signal can be derived from the vehicle on-board battery (RESS), and can become available over the vehicle CAN from the BMS. The status signal can include messages for temperature, SOC, SOH, and a command for inhibiting charging. The feedback signals can include, for example, an enable/inhibit WPT signal, the power rate parameters (such as charge rate $P_{chg}$ and the grid converter duty ratio d*), the frequency offset (f*), and any information associated with charging from multiple pad units such as may be found in a parking structure.

Thus, signals between the grid charger and vehicle can positively identify the vehicle as being parked above transmit pad k of N, where N is the number of individual pads capable of being energized at maximum power from a single grid converter. For the case of on-road dynamic charging this same signal will be used to sequence and energize small groups of embedded transmit coils, for example, 3 at a time out of dozens along a stretch of highway all driven by a single, high power grid converter.

Figure 7:
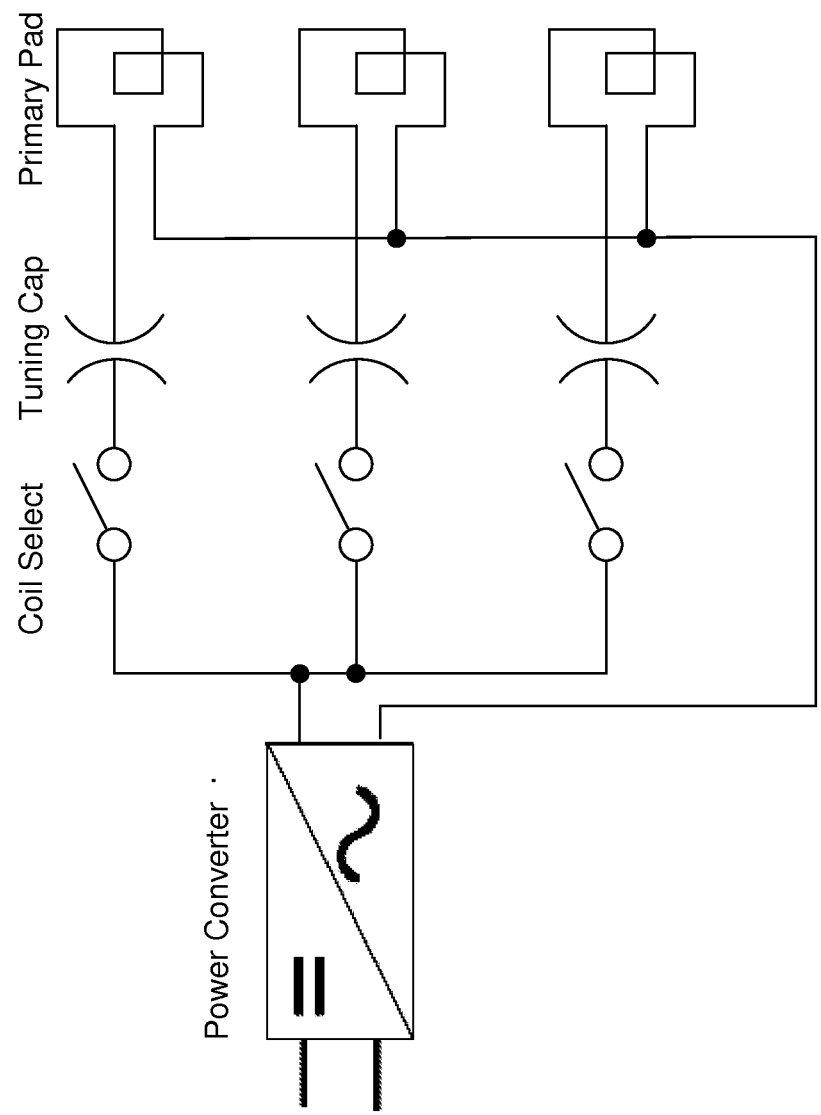
FIG. 7 is a schematic illustrating of the grid side of a wireless power transfer system in a configuration in which a plurality of primary circuits are present according to an embodiment of the present disclosure.

Referring to FIG. 7, a schematic for a charging station is shown, which can be employed for residential, stationary charging and public parking structure parking. A single grid charger is connected to a pair of transmit pads. In general these transmit pads will be individually energized by the power converter via dedicated switchgear and tuning capacitor modules. A vehicle parked above one transmit pad (primary pad) in a parking structure can cause only the pad that the vehicle is parked on to be energized, while not energizing any other transmit pad in the adjacent parking spaces where occupants can be standing while unloading the vehicle. Each transmit pad is tuned with a separate high voltage and high current ac capacitor.

In an exemplary evanescent wave power transfer demonstrator employed in the course of the research leading to the present disclosure, the tuning capacitors were 600 V high current induction heating units. A higher DC input voltage can also be employed. For example at 300 $V_{dc}$, the coupling coil and capacitor voltages can ring up to 2 kV and higher depending on the frequency and the loading.

Figure 8A:
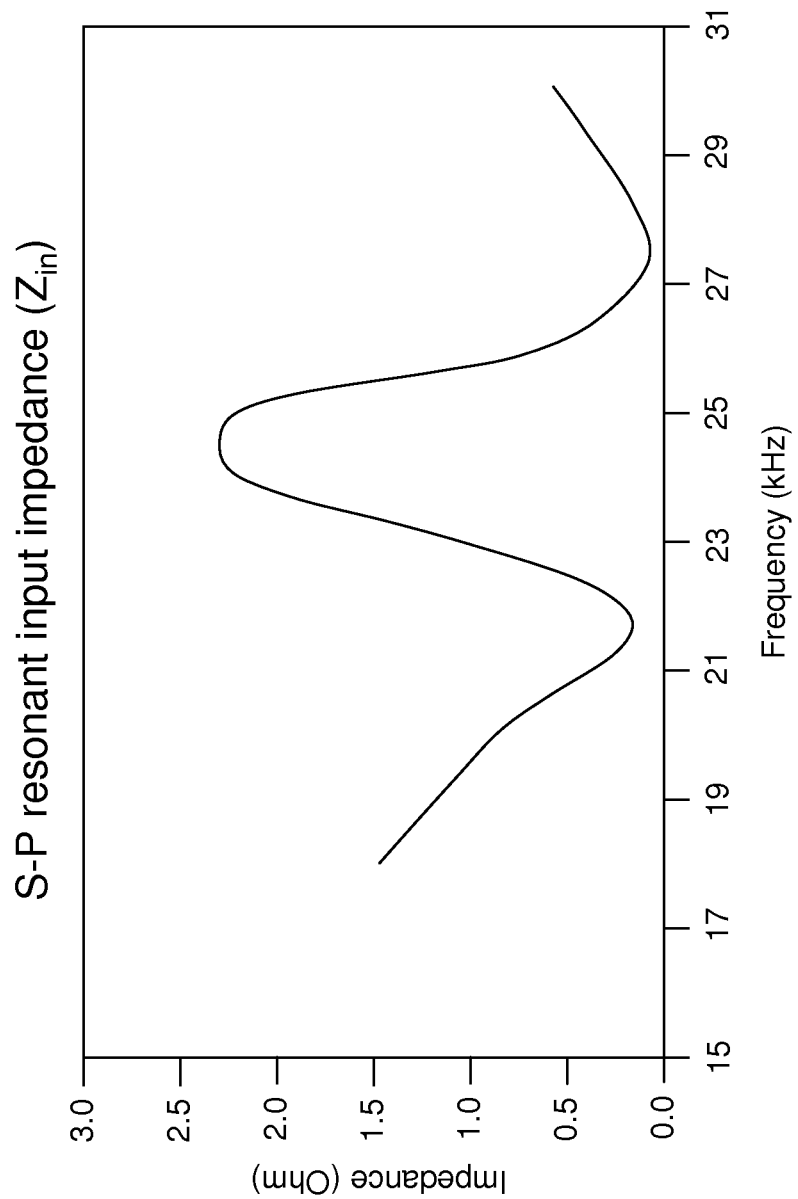
FIG. 8A is a graph of an input impedance of an exemplary wireless power transfer system including an unloaded primary pad as a function of frequency.
Figure 8B:
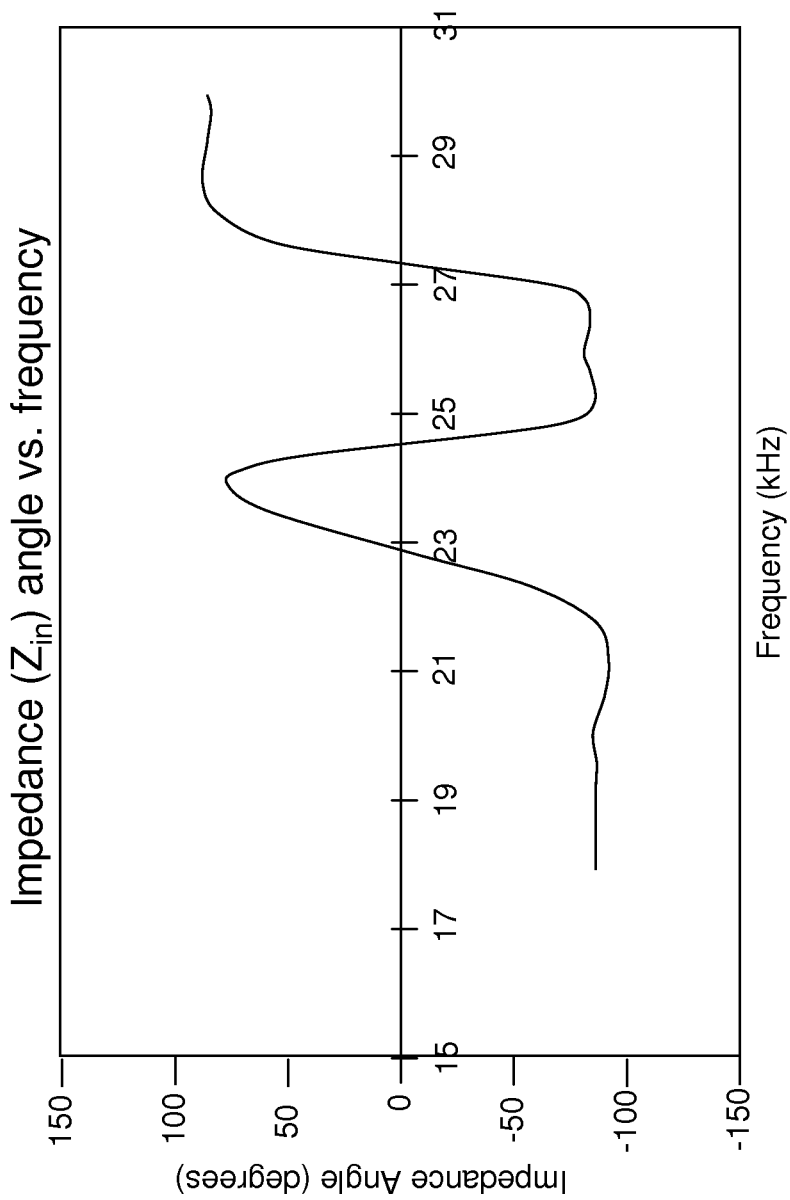
FIG. 8B is a graph of an impedance angle of the wireless power transfer system including an unloaded primary pad as a function of frequency.
Figure 8C:
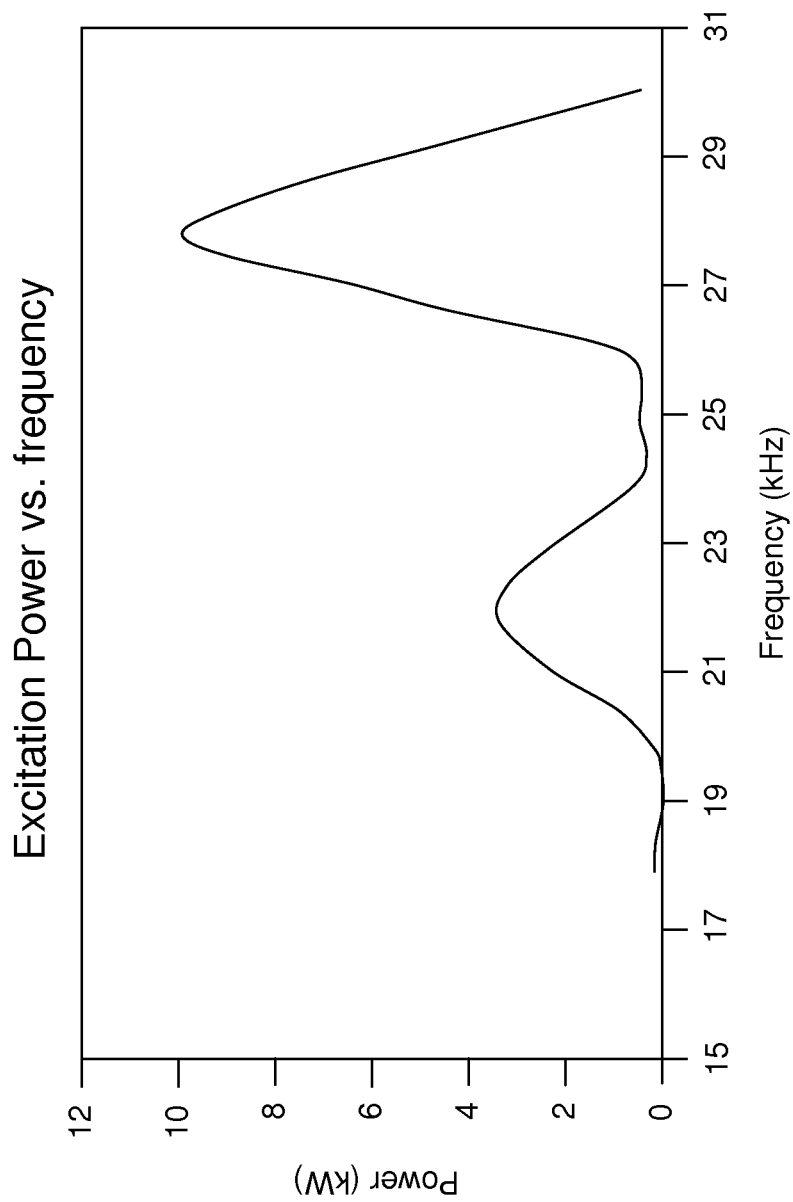
FIG. 8C is a graph of the excitation power of the wireless power transfer system including an unloaded primary pad as a function of frequency.

For example, when a vehicle is parked over the middle transmit pad shown in FIG. 7, assuming that both top and center transmit pads are connected to the power converter, then magnetic fields emanate from each transmit pad. However, only the transmit pad communicating with a properly tuned receiver coil will intercept real power and impose this burden on the converter. The top pad in this example will simply burden the power converter with reactive power. FIGS. 8A, 8B, and 8C describe this behavior through the parameters of the magnitude of the input impedance, the impedance angle, and the excitation power, respectively, for an unloaded pad. The unloaded transmit pad absorbs very small excitation power and therefore is not being a burden on the converter. Two distinct resonance minimums are present in the $Z_{in}$ response, one each for primary and secondary tuning and a maximum $Z_{in}$ intermediate to these. For the unloaded configuration, the maximum impedance frequency is about 25 kHz.

Figure 9A:
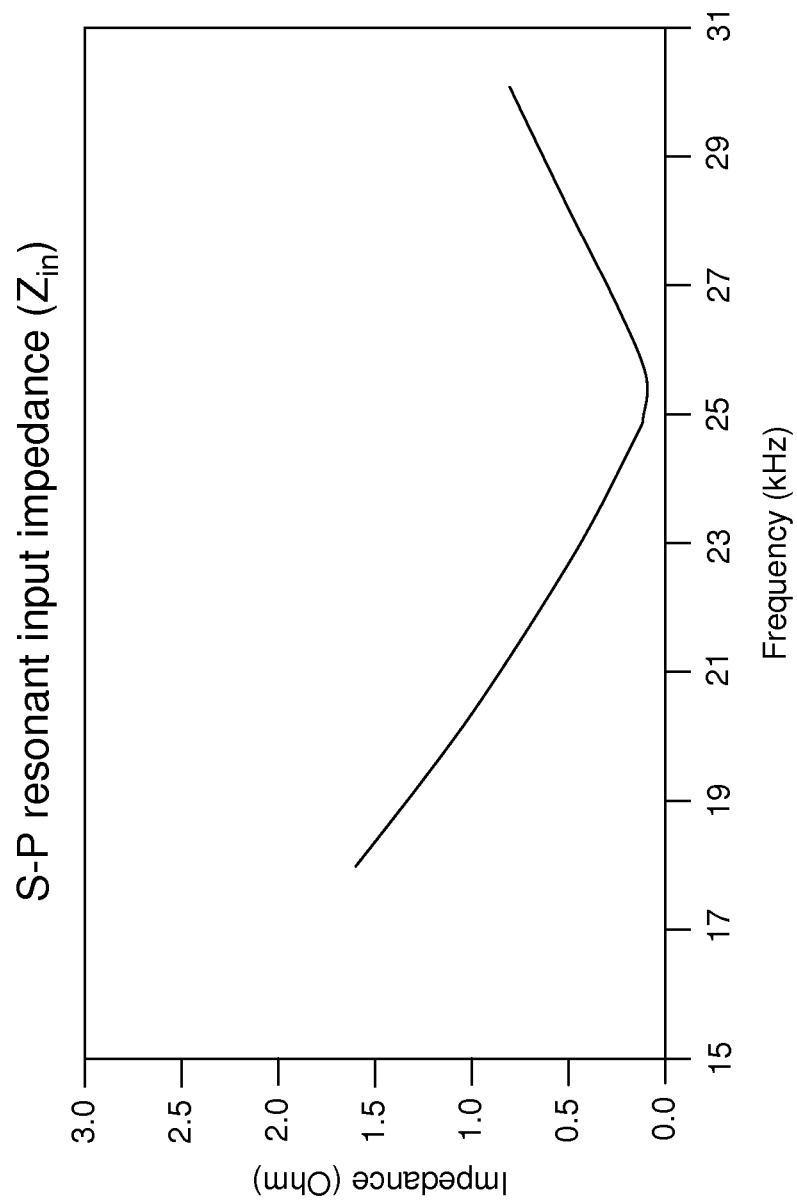
FIG. 9A is a graph of an input impedance of an exemplary wireless power transfer system including a loaded primary pad as a function of frequency.
Figure 9B:
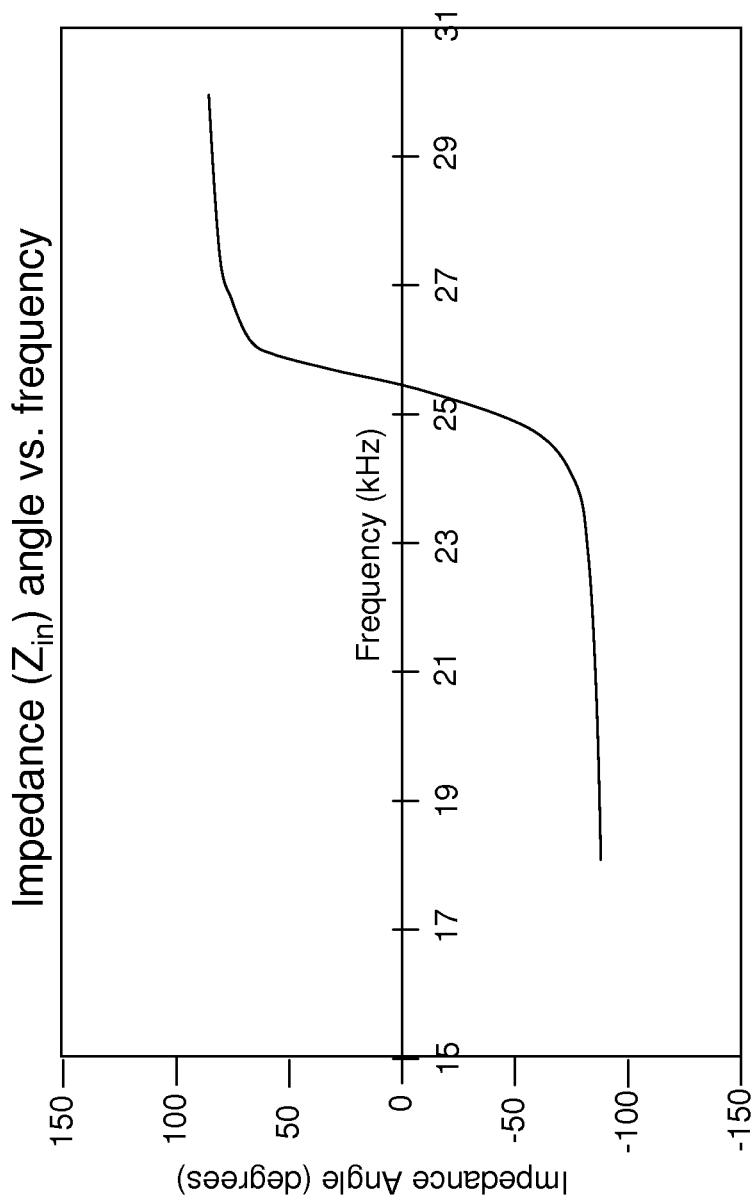
FIG. 9B is a graph of an impedance angle of the wireless power transfer system including a loaded primary pad as a function of frequency.
Figure 9C:
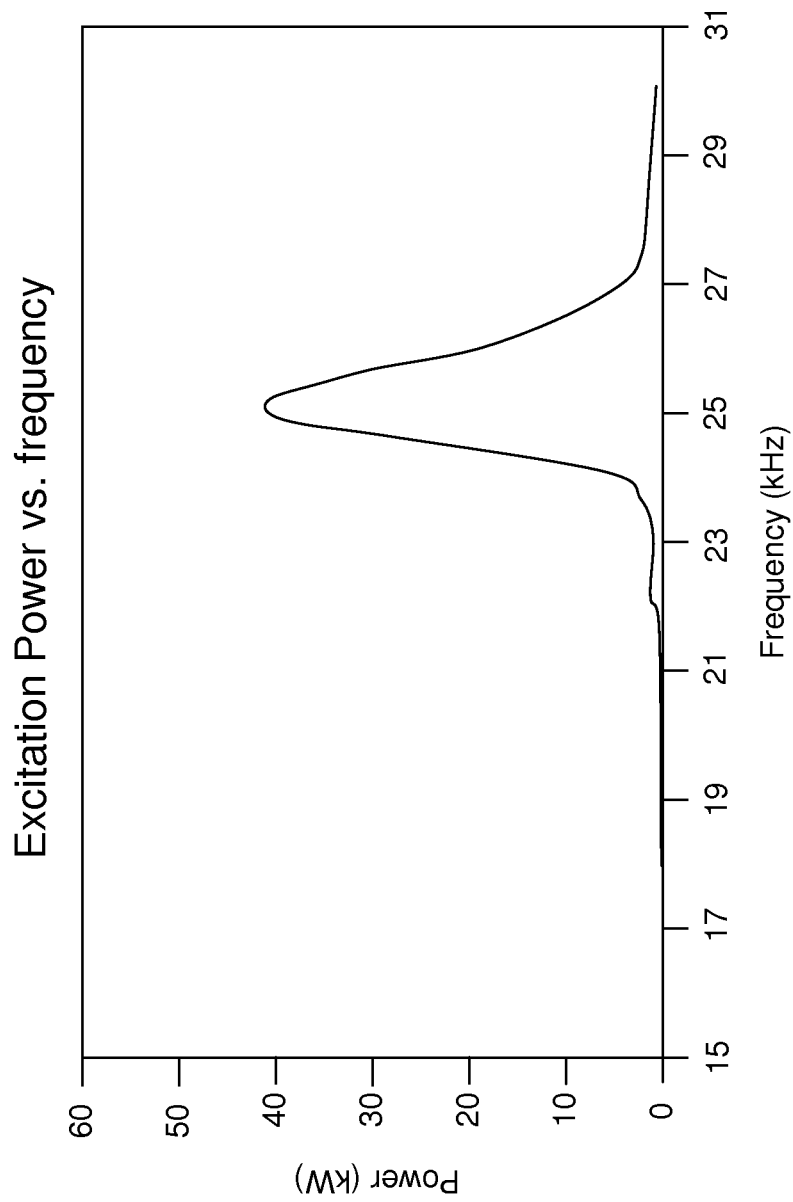
FIG. 9C is a graph of the excitation power of the wireless power transfer system including a loaded primary pad as a function of frequency.

In contrast, the loaded case is distinctly different in response from the unloaded transmit coil case. FIGS. 9A, 9B, and 9C describe this behavior through the parameters of the magnitude of the input impedance, the impedance angle, and the excitation power, respectively, for a loaded pad. Here, the individual resonance points are merged into a single composite (geometric mean) point of maximum admittance to the source.

The optimum operating frequency for the WPT is not the point at which the input impedance $Z_{in}$ becomes a maximum, i.e., the $Z_{inmx}$ point ($f_{o1}$=24.8 kHz) as for the nonleaded case. Instead, the optimum operating frequency for the WPT is the frequency, under loading, at which point the conjugate matched criteria results in unity power factor (PF) operation.

A case is considered below in which the equivalent load on the secondary is $R_L$=1.8 Ohm. Table 2 highlights the benefits of operating at the optimum operating frequency that is different from the resonance frequency of the magnetically coupled coils, and why WPT regulation according to an embodiment of the present disclosure can benefit from a feedback mechanism by providing the frequency offset f* to the grid converter, which would otherwise operate at the specified frequency $f_0$ of 24.8 kHz. The WPT energy management strategy of the present disclosure is therefore to operate at maximum PF for minimum cost power converter. This requires feedback of charge rate and frequency offset information based on mutual coupling coefficient values and alignment offset.

TABLE 2

Conjugate matched criteria for WPT regulation and EMS when k = 0.20 and $R_L$ = 1.8 Ohms.

| Frequency (kHz) | Power Factor | Im{$Z_c$} | −Im{$Z_1$} | Po (kW) | Efficiency |
|---|---|---|---|---|---|
| 25.2 | 0.946 | 0.0995 | 0.0747 | 55.77 | 0.903 |
| 25.3 | 0.996 | 0.1003 | 0.0936 | 61.81 | 0.903 |
| 25.35 | 0.999 | 0.1007 | 0.1030 | 62.28 | 0.903 |

TABLE 2-continued

Conjugate matched criteria for WPT regulation and EMS when k = 0.20 and $R_L$ = 1.8 Ohms.

| Frequency (kHz) | Power Factor | Im{$Z_c$} | −Im{$Z_1$} | Po (kW) | Efficiency |
|---|---|---|---|---|---|
| 25.4 | 0.988 | 0.1010 | 0.1124 | 60.87 | 0.903 |
| 25.5 | 0.926 | 0.1018 | 0.1312 | 53.56 | 0.903 |

The result found from the experiment summarized in Table 2 confirms earlier evanescent wave power transfer findings that efficiency changes very little across a band of frequency but power transfer does. Application of conjugate matching as proposed here shows that not only can efficiency be respectable, but unity power factor (PF) operation can be obtained and that the output power is maximized at this operating condition. The regulation control and energy management proposed means the WPT can be controlled via closed loop over the DSRC link to exhibit this level of power matching.

A second example illustrates the influence of vehicle receiver coil to transmit pad gap variation due to vehicle cargo load or transmit pad on floor as opposed to embedded into a floor. This variation of gap causes a reciprocal influence on coupling coefficient, k, so that the mutual inductance is impacted, and hence the power transfer efficiency is impacted. In this example, the coupling coefficient k of 0.22 means the vehicle mounted receiver coil is now somewhat closer to the transmit pad. When the coupling coefficient k was 0.22 in the exemplary evanescent wave power transfer demonstrator employed in the course of the research leading to the present disclosure, the spacing between the primary coil and the secondary coil was 10 inches (254 mm). When the spacing is increased to 11.2 inches (284 mm), the coupling coefficient k dropped to 0.20. The coupling coefficient k is defined by:

$$k = \frac{M}{\sqrt{L_{11}L_{22}}}, \quad (20)$$

in which M is the mutual inductance, and $L_{11}$ and $L_{22}$ are the inductances of the primary coil and the secondary coil, respectively.

TABLE 3

Conjugate matched criteria for WPT regulation and EMS when k = 0.22 and $R_L$ = 1.8.

| Frequency (kHz) | Power factor | Im{$Z_c$} | −Im{$Z_1$} | Power (kW) | Efficiency |
|---|---|---|---|---|---|
| 25.25 | 0.920 | 0.1209 | 0.0842 | 45.5 | 0.919 |
| 25.30 | 0.952 | 0.1214 | 0.0986 | 48.3 | 0.919 |
| 25.35 | 0.977 | 0.1218 | 0.1030 | 50.9 | 0.919 |
| 25.40 | 0.994 | 0.1222 | 0.1124 | 52.6 | 0.919 |
| 25.45 | 1.000 | 0.1227 | 0.1220 | 53.3 | 0.919 |
| 25.50 | 0.996 | 0.1230 | 0.1310 | 52.8 | 0.919 |
| 25.55 | 0.981 | 0.1236 | 0.1405 | 51.4 | 0.919 |
| 25.6 | 0.958 | 0.1240 | 0.1499 | 48.9 | 0.919 |

The following points can be deduced by comparing Table 2 and Table 3. The operating frequency is 100 Hz higher when the coupling coefficient k is 0.22 than when the coupling coefficient k is 0.20. Thus, the optimal power transfer frequency decreases as the gap increases, and vice versa. The power factor (PF) can be unity for the coupling constant k of 0.22 and for the coupling constant k of 0.20. With this same equivalent load resistance (which is not optimized), the maximum power transfer is 8.98 kW lower for the coupling constant k of 0.22 than for the coupling constant k of 0.20. This means that loading must change to re-optimize the maximum power transfer. The transfer efficiency is somewhat higher for the coupling constant k of 0.22 than for the coupling constant k of 0.20 mainly because the power levels are lower in for the coupling constant of 0.22. In both cases, however, the transfer efficiency can be constant to 3 decimal places as the operating frequency is adjusting to satisfy the conjugate matching criteria.

Now, when the load $R_L$=1.45 Ohm instead of 1.8 Ohm, the configuration having the coupling constant of 0.22 still shows unity power factor. However, the transferred power is 63.6 kW at the efficiency of 90%. As this example illustrates, the power factor is maintained by the frequency offset f* given by the derivation scheme (19), and the grid converter duty ratio d* given by the derivation scheme (17) controls the power flow. Thus, the frequency offset f* is independent of the grid converter duty ratio d*. By using the two independent parameter of the frequency offset f* and the grid converter duty ratio d*, grid converter power factor can therefore be managed to suit the grid connection and power flow can be managed to control regulation.

While the invention has been described in terms of specific embodiments, it is evident in view of the foregoing description that numerous alternatives, modifications and variations will be apparent to those skilled in the art. Each of the embodiments described herein can be implemented individually or in combination with any other embodiment unless expressly stated otherwise or clearly incompatible. Other suitable modifications and adaptations of a variety of conditions and parameters normally encountered in image processing, obvious to those skilled in the art, are within the scope of this invention. All publications, patents, and patent applications cited herein are incorporated by reference in their entirety for all purposes to the same extent as if each individual publication, patent, or patent application were specifically and individually indicated to be so incorporated by reference. Accordingly, the invention is intended to encompass all such alternatives, modifications and variations which fall within the scope and spirit of the invention and the following claims.

What is claimed is:

1. A system for wireless power transmission, said system comprising:
   a primary circuit including a grid converter and a primary coil located in a primary pad;
   a secondary circuit located in a vehicle and comprising a secondary coil, a current rectification circuit connected to said secondary coil, and a battery connected to said current rectification circuit;
   a battery management system configured to measure at least one parameter of said battery;
   a vehicle-side communication means configured to transmit information on said at least one parameter of said battery, wherein said at least one parameter is a measure of an effective resistance of said battery as seen by said primary circuit;
   an output voltage controller configured to control an alternating current (AC) output voltage of said grid converter based on information derived from said at least one parameter of said battery, wherein said information derived from said at least one parameter of said battery comprises a target value for each of one or more waveform parameters of said AC output voltage; and a computation means configured to generate said one or more target values from said at least one parameter of said battery.

2. The system of claim 1, wherein said AC output voltage is a quasi-square wave or a square wave, and has a duty ratio from, and including, 0 to, and including, 1.

3. The system of claim 2, wherein said output voltage controller is configured to control at least one of a duty cycle of said AC output voltage, a frequency of said AC output voltage, and a magnitude of said AC output voltage.

4. The system of claim 1, wherein said at least one parameter of said battery comprises at least one of temperature of said battery, a voltage level of said battery, and state of charge of said battery, a charge rate of said battery, and a parameter that is identical to, or is linearly proportional to, said effective resistance of said battery as seen by said primary circuit.

5. The system of claim 1, further comprising a gateway system configured to receive information on said at least one parameter of said battery as transmitted by said vehicle-side communication means, and configured to transmit said information derived from said at least one parameter, directly or indirectly, to said output voltage controller.

6. The system of claim 5, further comprising a grid-side communication means configured to receive said information derived from said at least one parameter, and configured to relay said information derived from said at least one parameter to said output voltage controller.

7. The system of claim 1, further comprising a gateway system configured to receive information on said at least one parameter of said battery as transmitted by said vehicle-side communication means, and configured to transmit said one or more target values, directly or indirectly, to said output voltage controller, wherein said computation means is in communication with said gateway system.

8. The system of claim 1, wherein said computation means is located within said vehicle and is in communication with said battery management system and said vehicle-side communication means, and said information on said at least one parameter of said battery as transmitted by said vehicle-side communication means comprises said one or more target values.

9. The system of claim 1, wherein said computation means is located within a facility that houses said grid converter, and is in communication with said vehicle-side communication means directly or indirectly, and said one or more target values are provided to said grid converter.

10. The system of claim 1, wherein said one or more target values comprise at least one of a target frequency for said AC output voltage, a target magnitude for said AC output voltage, and a target value for a parameter that controls a magnitude of a fundamental component of said AC output voltage.

11. The system of claim 1, wherein said at least one parameter of said battery comprises temperature of said battery and state of charge (SOC) of said battery, and said computation means is configured to determine a charge rate of said battery from said temperature of said battery and said SOC of said battery.

12. The system of claim 11, wherein said at least one parameter of said battery further comprises a voltage level of said battery, and said computation means is configured to determine said effective resistance of said battery as seen by said primary circuit.

13. The system of claim 12, wherein said computation means is configured to determine an input impedance of said secondary circuit as seen by said primary circuit.

14. The system of claim 13, wherein said computation means is configured to determine a frequency at which an imaginary component of input impedance of a circuit including said primary circuit and incorporating said input impedance of said secondary circuit becomes zero.

15. The system of claim 1, wherein said primary coil is located within a facility configured to park or store vehicles, underneath a road configured to allow vehicles to pass through, over a road configured to allow vehicles to pass through, or within a structure located on a side of a road configured to allow vehicles to pass through.

16. A method for wireless power transmission, said method comprising:
providing a primary circuit including a grid converter and a primary coil located in a primary pad;
providing a vehicle including a secondary circuit that comprises a secondary coil, a current rectification circuit connected to said secondary coil, a battery connected to said current rectification circuit, a battery management system configured to measure at least one parameter of said battery, a vehicle-side communication means configured to transmit information on said at least one parameter of said battery, wherein said at least one parameter is a measure of an effective resistance of said battery as seen by said primary circuit; and
modifying an alternating current (AC) output voltage of said grid converter based on information derived from said at least one parameter of said battery,
wherein said information derived from said at least one parameter of said battery comprises a target value for each of one or more waveform parameters of said AC output voltage, and
wherein a computation means generate said one or more target values from said at least one parameter of said battery.

17. The method of claim 16, wherein said AC output voltage is a quasi-square wave or a square wave, and has a duty ratio from, and including, 0 to, and including, 1.

18. The method of claim 17, wherein an output voltage controller modifies said AC output voltage by controlling at least one of a duty cycle of said AC output voltage, a frequency of said AC output voltage, and a magnitude of said AC output voltage.

19. The method of claim 17, wherein said output voltage controller controls a duty cycle of said AC output voltage, a frequency of said AC output voltage, and a magnitude of said AC output voltage.

20. The method of claim 16, wherein said at least one parameter of said battery comprises at least one of temperature of said battery, a voltage level of said battery, and state of charge of said battery, a charge rate of said battery, and a parameter that is identical to, or is linearly proportional to, said effective resistance of said battery as seen by said primary circuit.

21. The method of claim 16, wherein a gateway system receives information on said at least one parameter of said battery as transmitted by said vehicle-side communication means, and transmits said information derived from said at least one parameter, directly or indirectly, to an output voltage controller, wherein said output voltage controller modifies said AC output voltage.

22. The method of claim 21, wherein a grid-side communication means receives said information derived from said at least one parameter, and relays said information derived from said at least one parameter to said output voltage controller.

23. The method of claim 16, wherein a gateway system receives information on said at least one parameter of said battery as transmitted by said vehicle-side communication means, and transmits said information derived from said at least one parameter, directly or indirectly, to an output voltage controller, wherein said output voltage controller modifies said AC output voltage, wherein said computation means is in communication with said gateway system.

24. The method of claim 16, wherein said computation means is located within said vehicle and is in communication with said battery management system and said vehicle-side communication means, and said information on said at least one parameter of said battery as transmitted by said vehicle-side communication means comprises said one or more target values.

25. The method of claim 16, wherein said computation means is located within a facility that houses said grid converter, and is in communication with said vehicle-side communication means directly or indirectly, and said one or more target values are provided to said grid converter.

26. The method of claim 16, wherein said one or more target values comprise at least one of a target frequency for said AC output voltage, a target magnitude for said AC output voltage, and
    a target value for a parameter that controls a magnitude of a fundamental component of said AC output voltage.

27. The method of claim 16, wherein said at least one parameter of said battery comprises temperature of said battery and state of charge (SOC) of said battery, and said computation means is configured to determine a charge rate of said battery from said temperature of said battery and said SOC of said battery.

28. The method of claim 27, wherein said at least one parameter of said battery further comprises a voltage level of said battery, and said computation means determines said effective resistance of said battery as seen by said primary circuit.

29. The method of claim 28, wherein said computation means further determines an input impedance of said secondary circuit as seen by said primary circuit.

30. The method of claim 29, wherein said computation means further determines a frequency at which an imaginary component of input impedance of a circuit including said primary circuit and incorporating said input impedance of said secondary circuit becomes zero.

31. The method of claim 16, wherein said primary coil is located within a facility configured to park or store vehicles, underneath a road configured to allow vehicles to pass through, over a road configured to allow vehicles to pass through, or within a structure located on a side of a road configured to allow vehicles to pass through.

* * * * *